US008228942B2

(12) United States Patent  (10) Patent No.: US 8,228,942 B2
Mo  (45) Date of Patent: Jul. 24, 2012

(54) SYSTEM AND METHOD FOR IPV4 AND IPV6 MIGRATION

(75) Inventor: Li Mo, Plano, TX (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 88 days.

(21) Appl. No.: 11/860,389

(22) Filed: Sep. 24, 2007

(65) Prior Publication Data
US 2008/0075114 A1  Mar. 27, 2008

Related U.S. Application Data

(60) Provisional application No. 60/826,826, filed on Sep. 25, 2006.

(51) Int. Cl.
H04L 12/26 (2006.01)
(52) U.S. Cl. .................. 370/466; 370/389; 370/401
(58) Field of Classification Search .............. 370/466, 370/401, 389
See application file for complete search history.

(56) References Cited

U.S. PATENT DOCUMENTS

| | | | |
|---|---|---|---|
| 7,305,480 B2 * | 12/2007 | Oishi et al. | 709/230 |
| 7,391,768 B1 * | 6/2008 | Samprathi et al. | 370/389 |
| 7,450,499 B2 * | 11/2008 | Park et al. | 370/229 |
| 7,760,674 B2 * | 7/2010 | Oishi et al. | 370/310 |
| 2005/0152298 A1 * | 7/2005 | Thubert et al. | 370/312 |
| 2005/0286531 A1 * | 12/2005 | Tuohino et al. | 370/395.2 |
| 2005/0286553 A1 * | 12/2005 | Wetterwald et al. | 370/466 |
| 2006/0018272 A1 * | 1/2006 | Mutikainen et al. | 370/328 |
| 2007/0060097 A1 * | 3/2007 | Edge et al. | 455/404.1 |
| 2007/0195755 A1 * | 8/2007 | Li et al. | 370/352 |
| 2007/0195800 A1 * | 8/2007 | Yang et al. | 370/401 |
| 2008/0049648 A1 * | 2/2008 | Liu et al. | 370/310 |

FOREIGN PATENT DOCUMENTS

| | | | |
|---|---|---|---|
| CN | WO2006/037276 | * | 4/2006 |
| EP | 1 798 918 A1 | | 6/2007 |
| WO | WO 2006/037276 A1 | | 4/2006 |

OTHER PUBLICATIONS

G. Camarillo et al. (ERICSSON), Usage of the Session Description Protocol (SDP) Alternative Network Address Types (ANAT) Semantics in the Session Initiation Protocol (SIP), Jun. 2005, 6 pages, The Internet Society (2005).
Patent Cooperation Treaty—European International Searching Authority, PCT Notification of Transmittal of the International Search Report and the Written Opinion of the International Searching Authority, or the Declaration, Mar. 20, 2008, 13 pages, International Application No. PCT/US2007/079370.
Kurose, James F., and Ross, Keith W., *Computer Networking.: a top-down approach featuring the Internet*, 2005, 3rd Ed., pp. 347-351, Pearson Education, Inc.

* cited by examiner

*Primary Examiner* — Anh-Vu Ly
*Assistant Examiner* — Jay P Patel
(74) *Attorney, Agent, or Firm* — Connolly Bove Lodge & Hutz LLP

(57) ABSTRACT

A system, method, and computer-readable medium for IPv4 and IPv6 migration are provided. The invocation of NAPT-PT and NAPT are minimized inside a provider's network. NAPT-PT operations are invoked at most once inside the provider's network under all situations for a media path. Moreover, he minimum required NAPT operations are performed. If there is a required NAPT operation along the media path for IPv4 address realm mismatches, no NAPT-PT operation are performed solely for protocol conversion purposes.

11 Claims, 7 Drawing Sheets

SYSTEM AND METHOD FOR IPV4 AND IPV6 MIGRATION

RELATED APPLICATION DATA

This patent application claims the benefit of provisional U.S. Patent Application Ser. No. 60/826,826, filed Sep. 25, 2006.

BACKGROUND

The fast expansion of the Internet today reveals that the IPv4 address space is too small to cover the need of the future. This is already a problem in some countries. The next generation network protocol IPv6 is an elegant solution to this problem, where the main advantage lies in the huge address space. The transition from IPv4 to IPv6 is however difficult because it introduces new problems, such as separation of IPv4 and IPv6 networks. This results in users being unable to communicate between the two disparate networks.

BRIEF DESCRIPTION OF THE DRAWINGS

Aspects of the present disclosure are best understood from the following detailed description when read with the accompanying figures, in which.

DETAILED DESCRIPTION

Network Address Translation-Protocol Translation (NAPT-PT) is the mechanism for traversing between IPv4 and IPv6 networks. The IPv4-v6 inter-working issue contains both the signalling path part and the media path part. The signalling path will use RFC 3581 for rport to support NAT traversal, and use RFC 4092 and RFC 4091 (along with RFC 3388) to support Alternative Network Address Types (ANAT) functionalities, which offers the termination side both IP address types to minimize the NAPT-PT usage. As is understood, rport is a parameter of the Via header field that allows a client to request that the server send the response back to the source IP address and port where the request came from. The "rport" parameter is analogous to the "received" parameter, except "rport" contains a port number rather than an IP address.

Mobile inter-working has been addressed in TR 23.981 and is not further described herein. TR 23.981 is based on the restrictions of PDP type, which can be IPv4 only or IPv6 only. In this case, a mobile terminal would appear to be an IPv4 only terminal or an IPv6 only terminal, depending of the connectivity situation. If both the serving general packet radio service (GPRS) support node (SGSN) and the gateway GPRS support node (GGSN) support dual stack or IPv6, the UE would appear to be the IPv6 only. Otherwise, if both support IPv4, the UE would appear to be IPv4 only. The PDP context can not be established in other cases.

The fixed part of inter-working is more complex. It is desirable to have the fixed UE to be dual stack, and use the both stacks at the same time to minimize the usage of NAPT-PT inside the network. It is common knowledge that NAPT-PT breaks the peer-to-peer IP connectivity assumption and hence it causes difficulty for numerous applications.

Figure 1:
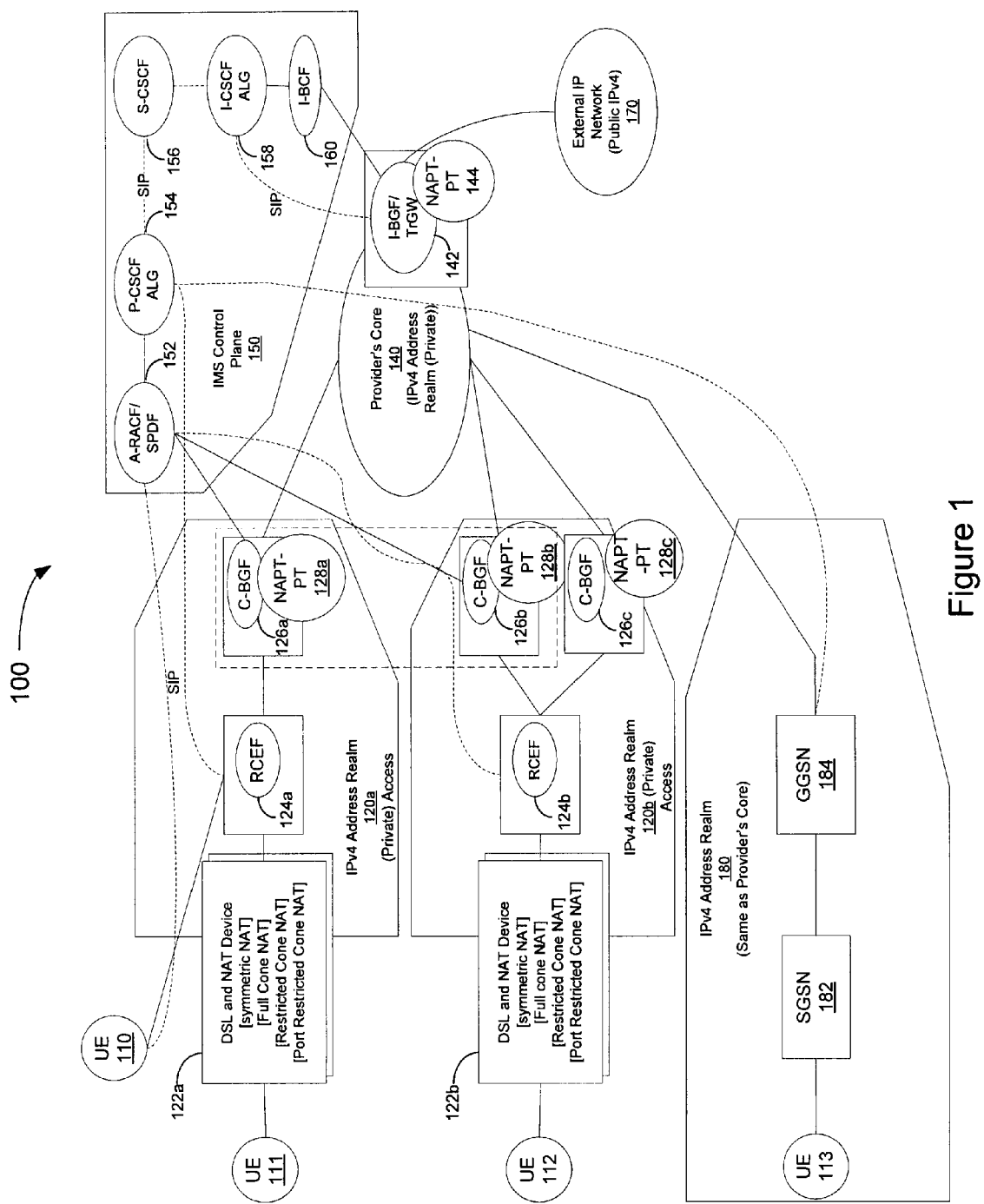
FIG. 1 is a diagrammatic representation of a network system 100 configuration in which IPv4 and IPv6 migration may be implemented in accordance with embodiments.

FIG. 1 is a diagrammatic representation of a network system 100 configuration in which IPv4 and IPv6 migration may be implemented in accordance with embodiments. System 100 includes a provider core 140 network that provides a private IPv4 core address realm. IP addresses may be provided to user equipments (UEs) 110-112 via IP address access realm 120a-120b serviced by provider core 140. UEs 111-112 may connect with provider core 140 via, for example, digital subscriber line (DSL) and network address translation (NAT) devices 122a-122b that provide network termination broad band access and provide IP masquerading. Devices 122a-122b may be implemented as an integrated device, although separate DSL and NAT devices, such as a DSL modem and router, may be substituted for devices 122a-122b.

Access devices 122a-122b may interface with the provider network via resource control enforcement functions (RCEFs) 124a-124b that are communicatively coupled with border functions, such as core-network border gateway functions (C-BGFs) 126a-126b and Network Address Translation-Protocol Translation (NAPT-PT) functions 128a-128b that interface with the provider's core network 140 and may interface with an IMS control plane 150. IMS control plane 150 includes an Access-Resource and Admission Control Function (A-RACF)/service policy decision function (SPDF) (referred to herein as A-RACF/SPDF 152). A-RACF/SPDF 152 facilitates resource reservation and admission control in the access network and may also facilitate end-to-end support of sessions. Policy decision functions of A-RACF/SPDF 152 may facilitate authorization of media plane resources, e.g., quality of service (QoS), policy control, bandwidth management, and other policy characteristics.

A proxy-call session control function (P-CSCF) 154 may include an ALG function. P-CSCF 154 may be assigned to a terminal during registration and is located in the signaling path of all session signaling messages. Additionally, P-CSCF 154 may facilitate user authentication among other functions. A serving-CSCF (S-CSCF) 156 comprises a central node of the signaling plane and may be implemented as a SIP server, and additionally provides session control. S-CSCF 156 may manage user profiles, e.g., via an interface with a home subscriber server (HSS). S-CSCF 156 manages SIP registrations that bind user locations, e.g., IP addresses, with SIP addresses. S-CSCF 156 is deployed in the signaling path and can inspect any signaling message of a session. S-CSCF 156 includes functionality for deciding to which application server a SIP message will be forwarded. Further, S-CSCF 156 may provide routing services, e.g., via electronic numbering (ENUM) lookups and enforce network operator policies, among other functions.

An interrogating-CSCF (I-CSCF) 158 comprises a SIP function that has an IP address assigned thereto published in the Domain Name System (DNS) to facilitate location by remote servers and use it as a forwarding point, e.g., for registering. I-CSCF 158 may query the HSS to obtain a user location, and then route a SIP request to the S-CSCF assigned to the user. Interconnection-Border control function (I-BCF) 160 provides a gateway to external networks.

An interworking-border gateway function (I-BGF)/translation gateway (I-BGF/TrGW) 142 provides media gateway border gateway functions, and a NAPT-PT 144 provides traversal between IPv4 and IPv6 networks and thus facilitates interfacing with a public IPv4 IP network 170.

In the illustrative example, system 100 includes an all IPv4 address realm 180, e.g., a cellular network system that only supports IPv4 terminals, such as UE 113. IPv4 address realm 180 may include a serving general packet radio service (GPRS) support node (SGSN) 182 that is responsible for the delivery of IPv4 data packets from and to UEs within its geographical service area. SGSN 182 provide packet routing and transfer, mobility management, e.g., attach/detach and location management, logical link management, and authentication and charging functions. SGSN 182 may interface with a gateway GPRS support node (GGSN) 184 that provides an interface between the GPRS backbone network and the external packet data networks, e.g., provider's core network 140 and IMS control plane 150. GGSN 184 converts GPRS packets received from SGSN 182 into the appropriate packet data protocol (PDP) format, e.g., IPv4 or X.25, and transmits the packets to the corresponding packet data network. Likewise, GGSN 184 converts PDP addresses of incoming data packets to the address of the destination user, e.g., UE 113. The readdressed packets are sent to the appropriate SGSN, which conveys the packets to the addressed UE.

The addressing mechanism of the exemplary system 100 provides for usage of global IPv6 addresses. Various local addresses of IPv6, besides at the link level, will not be used on the signaling and media path to provide services. Each Access network, controlled by multiple instances of C-BGFs, may have their own IPv4 address realm even though it is not very desirable because it increases the NAPT usage. The provider's core network 140 may have a private IPv4 realm which may differ from the IPv4 address realm used in access networks, e.g., address realms 120a-120b. A processing entity, such as a border gateway function, may receive a message from an address realm that is to be evaluated and/or processed prior to transmission of the message to a second address realm. If the processing entity is disposed between two distinct IPv4 address realms, e.g., a first private IPv4 address realm and a second private IPv4 address realm, a first private IPv4 address realm and a public IPv4 address realm, etc., the IPv4 address realms are referred to herein as having an IPv4 realm mismatch.

A fixed UE may have access to multiple instances of C-BGFs due to bandwidth and load-sharing considerations. Fixed UEs may be implemented as IPv4 only devices, IPv6 only devices, or dual stack devices adapted to support both IPv4 and IPv6 addresses. A fixed UE may be connected an RCEF via direct connection, home gateway, an enterprise edge router, or another suitable device.

A mobile UE may access system 100 via an SGSN and GGSN. A GGSN will be provisioned by the same provider as that of the P-CSCF. The GGSN will be located in the home network for IPv4 type (based on TR 23.981)

NAPT may be implemented in a C-BGF if there is difference between the access IPv4 realm and provider's core IPv4 realm. A NAPT-PT function may be located in a C-BGF for IPv4 and IPv6 transition. A NAPT function may be deployed in an I-BGF if the provider's core IPv4 realm is not public. A NAPT-PT function deployed in an I-BGF provides IPv4-v6 translation. IPv4-v6 translations may be used for flows to/from the provider's network to the peering network. The translation may also be used for media flows inside the provider's network.

The above outlines the general system configuration for solution of IPv4 and IPv6 migration and inter-working related issues implemented in accordance with disclosed embodiments. From the above outline, NAPT usage may be further limited if the provider's core IPv4 realm and access IPv4 realm should be the same.

An introduction of NAPT-PT and NAPT related processing rules implemented in accordance with embodiments is provided. NAPT-PT and NAPT processing rules may be imposed upon P-CSCF 154, a media gateway control function (MGCF), a media resource function (MRF), Application Servers, and the I-BCF 160.

In accordance with an embodiment, the invocation of NAPT-PT or NAPT is advantageously minimized inside the provider's network. Embodiments disclosed herein provide for limiting the NAPT-PT operation at most once inside the provider's network under all the situations for the media path. If there is a required NAPT operation along the media path for IPv4 address realm mismatches, there will advantageously be no NAPT-PT operation for protocol conversion purpose only. The provider's network is bordered by the I-BGF 142, GGSN 184, and C-BGF 126a-126c at the transport and media layer.

Various objectives are implemented according to processing rules implemented in various infrastructure of the provider's network. Those objectives can be further articulated in the following items:

Objective 1 (O1): NAPT-PT will only be invoked once inside a single provider's network for the media path for a particular flow or session.

Objective 2 (O2): NAPT operations will be combined with the NAPT-PT operations whenever possible.

Objective 3 (O3): Media traffic will be detoured for NAPT-PT usage only when there is no NAPT-PT capable network elements along the normal media path.

Objective 4 (O4): Implementation of disclosed embodiments are independent of network IPv4 addressing plans in the access network and the provider's core network, while the IPv6 address is assumed to be global.

Objective 5 (O5): Un-necessary invocation of service logic in S-CSCF 156 is avoided because of recursion of the signaling path, e.g., using a 305 SIP response from downstream nodes of the S-CSCF 156.

In the present example, assume that the provider's access address realm 120a-120b, the provider's core network 140 address realm, and the public Internet, e.g., IP network 170, are all distinct IP address realms for IPv4. In the event that some of the above mentioned IP realms are shared, processing rules discussed further hereinbelow may be applied because the IPv4 address realms are only imposing NAPT requirements.

In terms of NAPT-PT operations, the merging of the address realms will not affect the NAPT-PT locations in embodiments disclosed herein while the current work assumption presents the most challenging situation. There will be no change of the processing rules due to the difference in network addressing plans for IPv4.

Further assume that all the equipment along the signaling path are dual stack network elements supporting ANAT functions, e.g., as specified in RFC 4092 and RFC 4091 herein incorporated by reference. The network elements performing NAPT functions may also perform NAPT-PT functions.

Further assume that some border elements at the network edge are not capable of NAPT-PT and NAPT operations. Hence the network, on the access side, can be classified into two types. As referred to herein, a network of Type A comprises an access network that is capable of performing NAPT-PT and NAPT operations, e.g., the network includes a C-BGF. In the present example, it is assumed that IPv4 address realms 120a-120b are implemented in a Type A access network. As referred to herein, a type B network comprises an access network that is not capable of performing NAPT-PT and NAPT operations, e.g., GGSN. In the present example, it is assumed that IPv4 address realm 180 is implemented in a Type B access network.

The access network type designation will be used for presentation purposes only. Any decision regarding the type of the access network would be local, e.g., P-CSCF 154 knows whether it has a corresponding SPDF and C-BGF in order to perform the NAPT-PT task.

The border element C-BGF is assumed to be NAPT-PT and NAPT capable while the GGSN does not have NAPT-PT and NAPT functionalities. In general, P-CSCF 154 with corresponding SPDF and C-BGF 126a-126c are considered as Type A, and all the other types of network are considered to be Type B, e.g., the network providing IP address realm 180.

Embodiments disclosed herein feature processing rules implemented at P-CSCF 154, MGCF, MRFC, application servers, and I-BCF 160.

Principals of operation of embodiments disclosed herein are summarized as follows:

Principal 1 (P1): The IP version selection decision making point shall be at the border of the network. It is the responsibility of the decision making point to invoke the required NAPT-PT operation, either locally or remotely. The possible termination points are I-BCF 160, and the terminating P-CSCF, MGCF, MRFC, and application server. Only the NAPT-PT operations controlled by I-BCF 160 can be invoked remotely, e.g., by P-CSCF 154 or by a MGCF.

Principal 2 (P2): NAPT-PT capable network elements, e.g., I-BCF 160 and P-CSCF 154 with the corresponding SPDF and C-BGF shall emulate dual stack user equipment if there is only one IP version in the session description protocol (SDP) and if the immediate downstream entity on the SIP signaling path is not the termination UE or a peering network.

The detection point for this operation is on the originating and terminating P-CSCF or I-BCF. A first operational rule implemented in accordance with the disclosed embodiments is as follows:

Rule G1: NAPT invocation is performed whenever the address realm mismatch is detected for IPv4 traffic.

As referred to herein, the "originating" or "origination" side is reference to the network side from which an initial SIP INVITE Request for a session is originated. Rules specified for the originating side specify processing that shall be performed on forwarding SIP INVITE Request and 200 SIP Response received at the originating side from the terminating side in response to receipt of an INVITE by the terminating side. A first originating-side rule (Rule O1) is as follows:

Rule O1: If there is only one address type in the SDP of the SIP INVITE Request, the P-CSCF in the Type A access network shall emulate a dual stack UE (according to Principal P2).

The "Dual Stack Emulation" (DSE) for the UE performed by P-CSCF 154 reformats the SDP with ANAT groups to offer both address types to the termination side. The first group in ANAT shall be the IP address type of the UE.

A second originating-side rule (Rule O2) is as follows:

Rule O2: On receiving the 200 SIP Response, the network elements that have performed DSE shall be responsible to select the IP version in the response.

If the answered address type contains the IP version used by the originating UE, the NAPT-PT operation shall not be performed on the originating side.

Figure 2A:
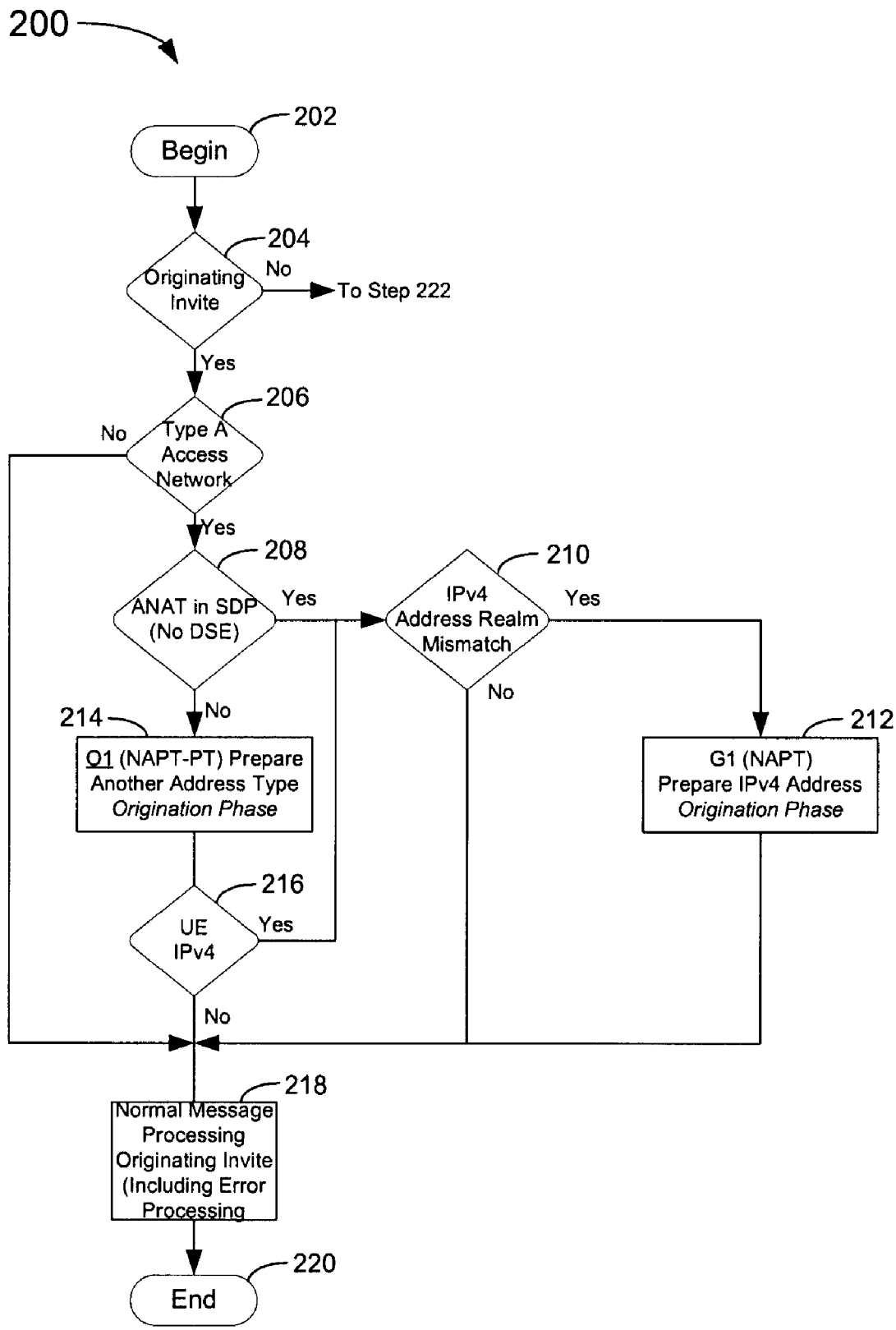
FIGS. 2A and 2B comprise a flowchart depicting originating-side processing for IPv4 and IPv6 migration implemented in accordance with an embodiment.
Figure 2B:
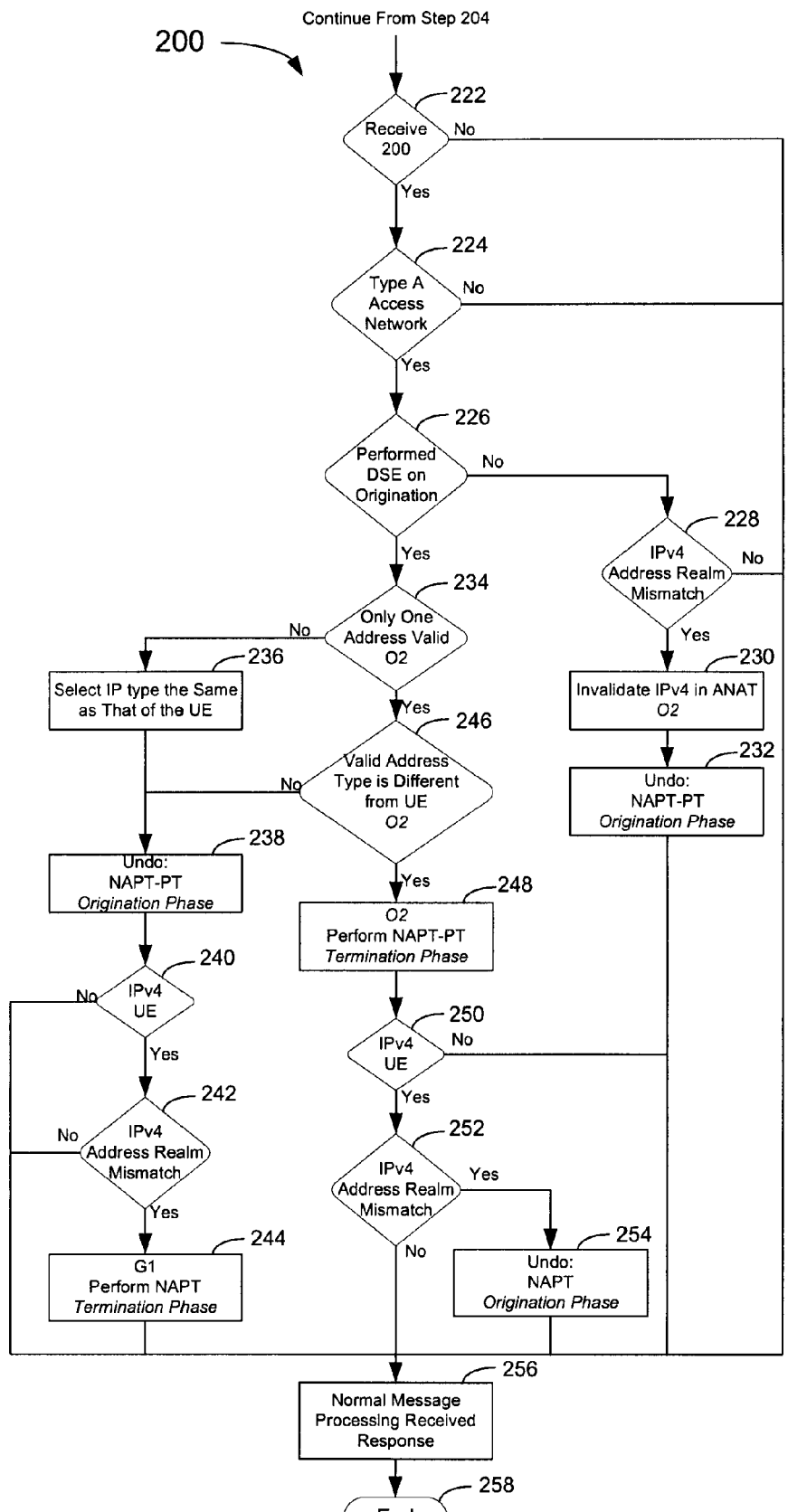

FIGS. 2A and 2B comprise a flowchart 200 depicting originating-side processing for IPv4 and IPv6 migration implemented in accordance with an embodiment.

With reference now to FIG. 2A, the processing routine is invoked (step 202), e.g., on receipt of a SIP message, and an evaluation is made to determine if the received message is an INVITE (step 204). In the event the received message is not an INVITE, e.g., the message is a response, processing proceeds to step 222 described more fully hereinbelow with reference to FIG. 2B.

If the received message comprises an INVITE, an evaluation is made to determine if the access network is a type A access network (step 206), that is whether the access network is capable of performing NAPT-PT and NAPT operations. If the network is not a Type A access network, the message is processed according to conventional mechanisms (step 218). If the access network is evaluated as a Type A access network at step 206, an evaluation is made to determine if Alternative Network Address Types (ANAT) are in the SDP (step 208). If ANAT is included in the SDP, an evaluation is made to determine if there is an IPv4 address realm mismatch (step 210). If there is not an IPv4 address realm mismatch, the routine may proceed to process the message according to conventional mechanisms according to step 218. If an IPv4 address realm mismatch is identified at step 210, an IPv4 address is prepared according to rule G1 (step 212), and the packet is then processed according to conventional mechanisms (step 218).

Returning again to step 208, if there is no ANAT in the SDP, NAPT-PT processing is invoked by P-CSCF 154 to prepare another address type according to rule O1 (step 214). That is, if only an IPv4 address is included in the message, and IPv6 address is prepared and included in the INVITE. Likewise, if only an IPv6 address is included in the INVITE message, an IPv4 address is prepared and included in the INVITE message. Thus, P-CSCF 154 reformats the SDP with ANAT groups to offer both address types to the termination side. The first group in the ANAT of the INVITE is set as the IP address type of the originating UE. An evaluation is then made to determine if the originating UE is an IPv4 UE (step 216). If the originating UE comprises an IPv4 UE, processing proceeds to evaluate whether there is an IPv4 address realm mismatch according to step 210. If the UE is not an IPv4 UE, i.e., the UE is either an IPv6 or a dual stack UE, the INVITE message may then be processed according to conventional mechanisms (step 218), and the originating side processing cycle may then end (step 220).

With reference now to FIG. 2B, originating side processing evaluates the received message to determine if the message comprises a Receive 200 response (step 222). If the message does not comprise a Receive 200, the received message is processed according to conventional message processing for a received response (step 258). If the received message is a Receive 200 message, an evaluation may be made to determine if the access network comprises a Type A access network (step 224). If the access network is not a Type A access network, the received message is processed according to conventional message processing for a received response according to step 258. If it is determined that the access network comprises a Type A access network at step 224, an evaluation is then made to determine if dual stack emulation was performed on the origination message for which the current response has been received (step 226). If it is determined that DSE was not performed on the origination message, an evaluation may be made to determine if there is an IPv4 address realm mismatch (step 228). If an IPv4 realm mismatch is not identified, the message is processed according to conventional message processing for a received response according to step 258. If it is determined at step 228 that an IPv4 realm mismatch exists, the IPv4 address in the ANAT is invalidated according to rule O2 (step 230), and NAPT-PT processing is not performed on the originating side (step 232). The message having the IPv4 address invalidated is then processed according to conventional message processing for a received response according to step 258.

Returning again to step 226, if dual stack emulation was performed on the originating message, an evaluation is made to determine if only one address is valid according to rule O2 (step 234). If both addresses are valid, the IP type of the originating UE is selected as the address type (step 236), and NAPT-PT is not performed on the origination side (step 238). An evaluation is then made to determine if the originating UE comprises an IPv4 UE (step 240). If the originating UE does not comprise an IPv4 UE, the message is then processed according to conventional message processing for a received response according to step 258. If the originating UE is identified as an IPv4 UE at step 240, an evaluation is then made to determine if there is an IPv4 address realm mismatch (step 242). If there is not an IPv4 address realm mismatch, the message is then processed according to conventional message processing for a received response according to step 258. If an IPv4 address realm mismatch is identified at step 242, termination phase NAPT processing is invoked (step 244), and the message is then processed according to step 256.

Returning again to step 246, in the event that the valid address type is different than the originating UE address type, termination phase NAPT-PT is performed (step 248). An evaluation is then made to determine if the originating UE is an IPv4 UE (step 250). If the originating UE is not an IPv4 UE, the message is then processed according to step 256. If the originating UE is determined to be an IPv4 UE at step 250, and evaluation is then made to determine if there is an IPv4 address realm mismatch (step 252). If an IPv4 address realm mismatch is identified, an origination phase undo NAPT process is invoked (step 254), and the message is then processed according to step 256. If an IPv4 address realm mismatch is not identified at step 252, the message is then processed according to step 256, and the origination side processing cycle may then end (step 258).

On the termination side, received SIP messages comprise SIP INVITE Request messages. Besides forwarding of the message further on the termination side, the termination side detection point or entity will also be responsible of selecting the IP version if both IP versions are provided in the SDP of the SIP INVITE Request in the event the termination side UE is not a dual stack UE. The selected IP version is then sent on the 200 SIP response to the originating side. The termination side is additionally responsible to engage the I-BCF if an IP version incompatibility can not be resolved.

A first termination side rule (Rule T1) implemented in accordance with an embodiment is as follows.

Rule T1: On receiving an SDP INVITE Request without ANAT groups, if a UE version mismatch is detected, the termination side will perform the required NAPT-PT function if the access network is Type A.

A second termination side rule (Rule T2) implemented in accordance with an embodiment is as follows.

Rule T2: On receiving an SDP INVITE Request without ANAT groups, if a UE version mismatch is detected, the termination side will invoke an I-BCF to perform the required NAPT-PT function if such function can not be performed locally.

This operation may stop the processing of the SIP INVITE Request, and forward the SIP INVITE Request to an I-BCF with top level Route header set to the forwarding entity so that the request will be send back after the NAPT-PT invocation by the I-BCF for further processing.

A third termination side rule (Rule T3) implemented in accordance with an embodiment is as follows.

Rule T3: On receiving a SIP INVITE Request with an ANAT group in the SDP, if a NAPT operation has to be performed at the termination side for IPv4 if selected or the termination UE is dual stack, the SIP INVITE Request transmitted to the UE will only contain the value of the first ANAT group. The corresponding 200 SIP Response transmitted to the S-CSCF will respond with the first ANAT group valid and with the second ANAT group invalid.

The NAPT operation is to be performed if there is difference between the provider's access and core IPv4 address realm.

A fourth termination side rule (Rule T4) implemented in accordance with an embodiment is as follows.

Rule T4: On receiving the SIP INVITE Request with an ANAT group in SDP, if Rule T3 is not employed, the 200 SIP Response will respond in accordance with the user terminal type. In this case, the SIP INVITE Request transmitted to the UE will only contain the address type of the UE.

The termination side eliminates the ANAT groups in the SDP for the SIP INVITE Request to be forwarded in accordance to the selected IP address type.

Figure 3:
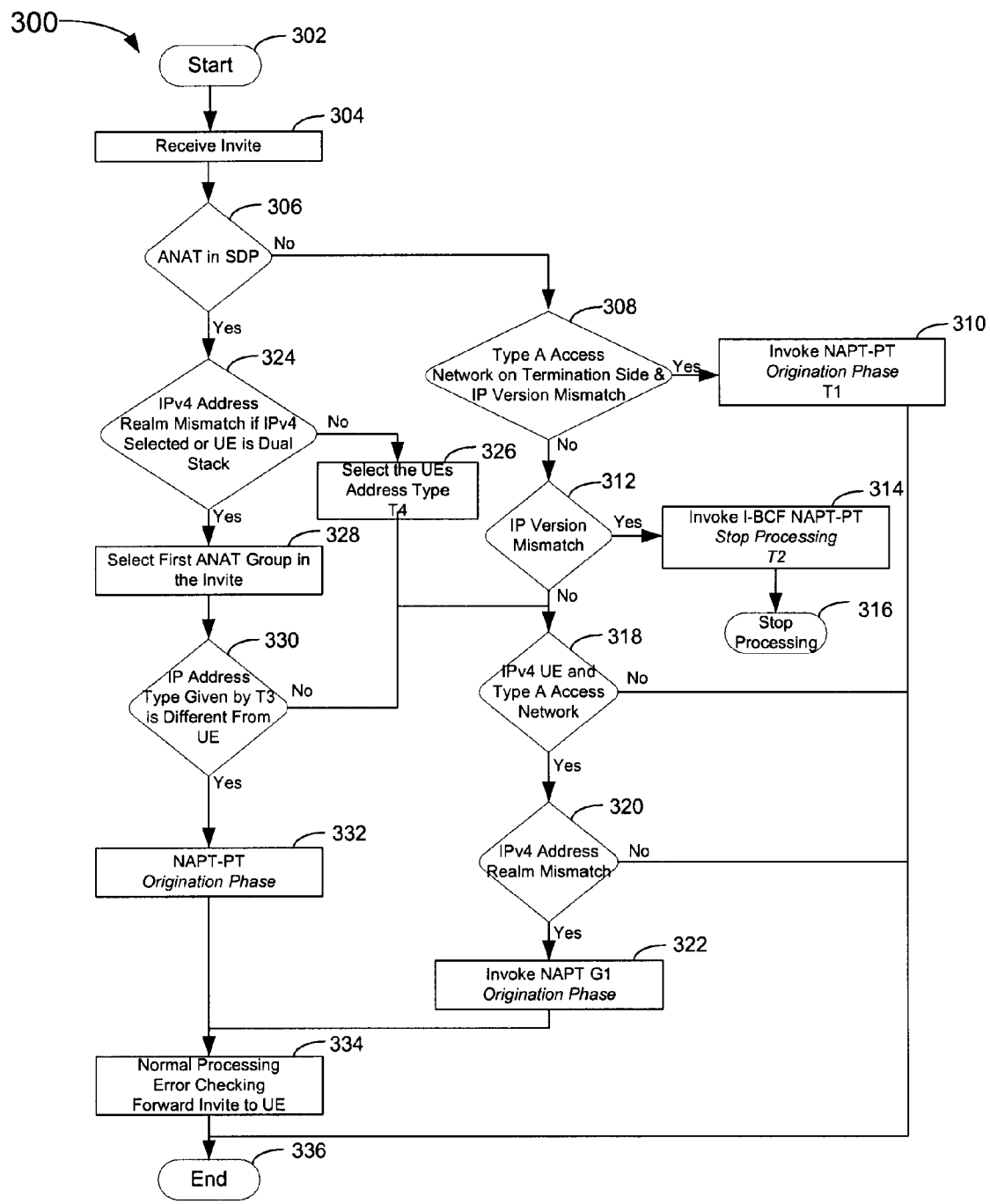
FIG. 3 is a flowchart depicting termination side processing implemented in accordance with an embodiment.

FIG. 3 is a flowchart 300 depicting termination side processing implemented in accordance with an embodiment.

The termination side processing is invoked (step 302), and an INVITE message is received from the origination network (step 304). An evaluation is made to determine if ANAT is included in the SDP (step 306). If no ANAT is included in the SDP, and evaluation is made to determine if the termination side network is a Type A access network, and if there is an IP version mismatch. If the access network is a Type A network and there is an IP version mismatch, origination phase NAPT-PT is invoked according to the termination rule 1 (step 310). The termination side processing routine cycle may then end (step 336).

Returning again to step 308, if the access network is not a Type A network, or if there is not an IP version mismatch, an evaluation is made to determine if the IP version is mismatched (step 312). If the IP version is mismatched, NAPT-PT processing is invoked at the I-BCF (step 314) according to the termination rule 2 (T2), and processing is then terminated (step 316).

Returning again to step 312, if it is determined that there is not an IP version mismatch, and evaluation is made to determine if the termination side UE is an IPv4 UE and if the access network is a Type A network (step 318). If the UE is not an IPv4 UE, or if the access network is not a Type A network, termination side processing may terminate according to step 336. If it is determined that the UE is an IPv4 UE or the access network is a Type A access network, an evaluation is made to determine if there is an IPv4 address realm mismatch (step 320). If no IPv4 address realm mismatch is identified, the termination side processing may end according to step 336. If an IP address realm mismatch is identified at step 320, NAPT processing is invoked according to rule G1 (step 322), and termination side processing may then proceed according to conventional processing mechanisms such that the INVITE is forwarded to the termination side UE (step 334).

Returning again to step 306, if ANAT is included in the SDP, an evaluation is made to determine if there is an IPv4 address realm mismatch (step 324), i.e., if IPv4 is selected or the UE is a dual stack UE. If there is no IPv4 address realm mismatch, the address of the ANAT that corresponds to the UE type is selected (step 326), and the termination side processing routine may then whether the UE is an IPv4 UE and if the access network comprises a Type A access network according to step 318.

Returning again to step 324, if an IPv4 address realm mismatch is identified, the first ANAT group in the INVITE is selected (step 328), and an evaluation of whether the IP address type given by termination rule T3 is different from the UE address type (step 330). If there is no difference in the address types, the termination side processing routine may then determine whether the UE is an IPv4 UE and if the access network comprises a Type A access network according to step 318. IF there is a difference in the address types, origination phase NAPT-PT processing is invoked (step 332), and conventional processing of the message is invoked such that the INVITE is forwarded to the termination side UE according to step 334. The termination side processing routine cycle may then end (step 336).

On receiving a 200 SIP Response from the UE, the termination phase of NAPT-PT or NAPT can be performed to attempt to finish any pending NAPT-PT or NAPT operation if the termination side rules T1 or T3 are performed when forwarding the SIP INVITE Request to the termination side UE.

Various processing rules for I-BCF 160 are implemented to facilitate IPv4 and IPv6 migration according to disclosed embodiments. A first I-BCF rule (Rule I1) implemented in accordance with an embodiment is as follows:

Rule I1: The I-BCF will invoke the NAPT-PT and ALG functions on receiving a SIP INVITE Request from inside the network with the next hop also inside the same network.

A second I-BCF rule (Rule I2) implemented in accordance with an embodiment is as follows:

Rule I2: The I-BCF will invoke the NAPT-PT and ALG functions on receiving a SIP INVITE Request from inside the network which is deemed to go outside the provider's network with addressing type mismatch unresolvable by the previous hops along the media path. If the SDP in the SIP INVITE Request has ANAT groups, Rule I2 will not apply because the originator of the ANAT group can resolve the address type mismatch.

A third I-BCF rule (Rule I3) implemented in accordance with an embodiment is as follows:

Rule I3: On receiving a SIP INVITE Request without an ANAT group from outside the network, the I-BCF will emulate a dual stack originating UE by inserting the ANAT groups. The first ANAT group will have the same IP version as that of the SDP in the SIP INVITE Request.

A fourth I-BCF rule (Rule I4) implemented in accordance with an embodiment is as follows:

Rule I4: On receiving a 200 SIP Response from inside the network, the I-BCF will select the IP version if a local NAPT-PT operation can be avoided if the I-BCF has performed ANAT group insertion (per Rule I3).

The I-BCF has to make a selection if both versions of the IP address are valid in the 200 SIP Response, which also implies that the UE is a dual stack UE. A 200 SIP Response with a single valid IP version will be normally received.

A fifth I-BCF rule (Rule I5) implemented in accordance with an embodiment is as follows:

Rule I5: On receiving a SDP INVITE Request with ANAT groups from inside the network, if a NAPT operation has to be performed at the border point, the 200 SIP Response will respond with the first ANAT group valid and with the second ANAT group invalid. The border point (I-BCF) will eliminate the ANAT groups in the SDP for the SIP INVITE Request to be forwarded in accordance to the selected IP address type.

A sixth I-BCF rule (Rule I6) implemented in accordance with an embodiment is as follows:

Rule I6: On receiving a SDP INVITE Request with an ANAT group from inside the network, if Rule I5 is not employed, the 200 SIP Response will respond in accordance with the peering network's IP address type.

The border point (I-BCF) will eliminate the ANAT groups in the SDP for the SIP INVITE Request to be forwarded in accordance to the selected IP address type.

Figure 4:
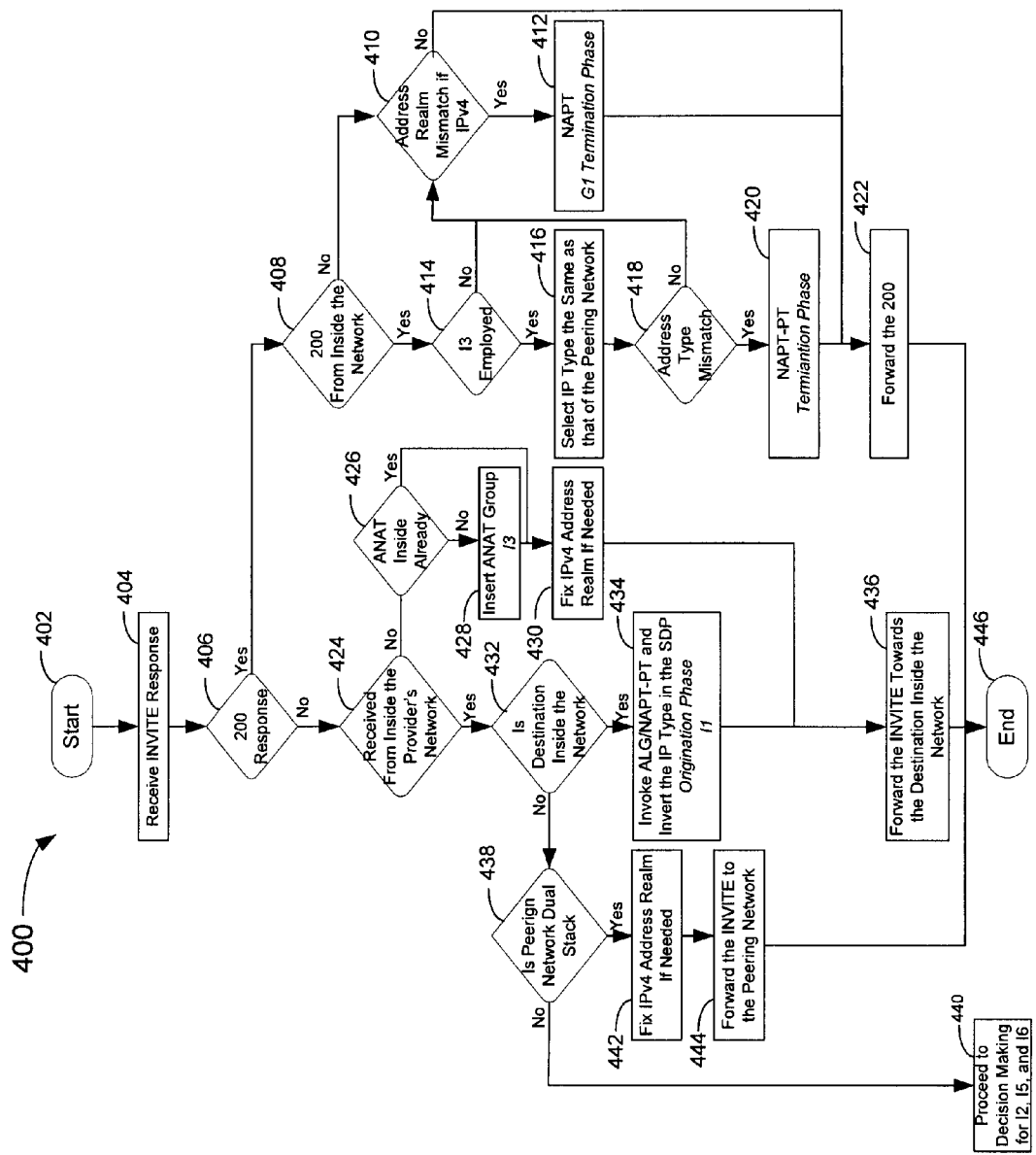
FIG. 4 is a flowchart depicting I-BCF processing that facilitates IPv4 and IPv6 migration in accordance with an embodiment.

FIG. 4 is a flowchart 400 depicting I-BCF processing that facilitates IPv4 and IPv6 migration in accordance with an embodiment.

The I-BCF processing routine is invoked (step 402), and an INVITE response is received (step 404). An evaluation is then made to determine if the INVITE response is a 200 response (step 406). If the INVITE response is a 200 response, an evaluation is made to determine if the 200 response originated from inside the network (step 408). If the 200 response is not from inside the network, and evaluation is made to determine if there is an address realm mismatch if the address is an IPv4 address (step 410). If there is no address realm mismatch, the I-BCF processing may proceed to forward the 200 response message (step 422). If there is an address realm mismatch identified at step 410, termination phase NAPT processing is invoked according to rule G1 (step 412), and the 200 response message is forwarded according to step 422.

Returning again to step 408, if the 200 response message is from within the network, and evaluation is made to determine if rule I3 has been invoked for processing (step 414). If the I-BCF rule I3 has not been employed, an evaluation is then made to determine if there is an address realm mismatch according to step 410. If the I-BCF rule I3 has been employed, the IP type is selected to be the same as that of the peering network (step 416). An evaluation is then made to determine if there is an address type mismatch (step 418). If no address mismatch is identified, an evaluation is made to determine if there is an address realm mismatch according to step 410). If an address realm mismatch is identified at step 418, termination phase NAPT-PT processing is invoked (step 420), and the 200 response message is forwarded according to step 422. After the 200 response message is forwarded, the I-BCF processing cycle may terminate according to step 446.

Returning again to step 406, if the received message is not a 200 response message, an evaluation is made to determine if the message was received from inside the provider's network (step 424). If the message is not received from inside the network, an evaluation is made to determine if the ANAT is included in the message (step 426). If ANAT is included in the message, the I-BCF proceeds to fix the IPv4 address realm if needed (step 430). If ANAT is not inside the message, an ANAT group is inserted into the message according to rule I3 (step 428), and processing proceeds to fix the IPv4 address realm as needed according to step 430. Processing may then proceed to forward the INVITE message towards the destination inside the network (step 436). The I-BCF processing cycle may then complete (step 446).

Returning again to step 424, if the message is received from inside the network, an evaluation is made to determine if the destination is inside the network (step 432). If the destination is inside the network, origination phase ALG/NAPT-PT is invoked, and the IP type is inverted in the SDP (step 434). The INVITE message is then forwarded towards the destination inside the network according to step 436).

Returning again to step 432, if the destination is not inside the network, an evaluation is made to determine if the peering network is a dual stack network (step 438). If the peering network is a dual stack network, the IPv4 address realm is fixed if needed (step 442), and the INVITE message is forwarded to the peering network (step 444). The I-BCF processing cycle may then complete according to step 446.

Returning again to step 438, if the peering network is not a dual stack network, the I-BCF processing proceeds to a decision making subroutine for evaluating the I-BCF rules I2, I5, and I6 (step 440) as described below with reference to FIG. 5.

Figure 5:
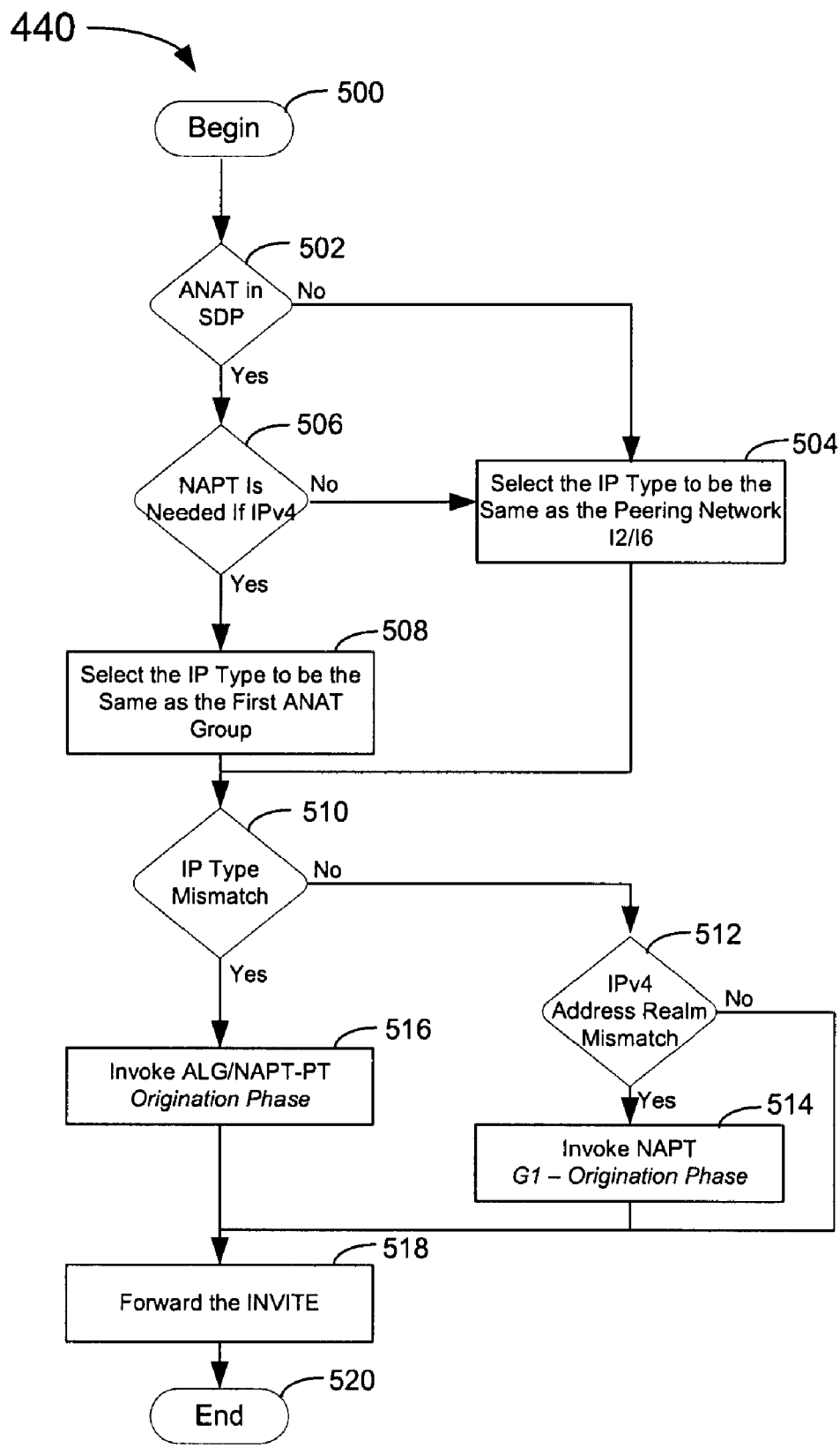
FIG. 5 is a flowchart that depicts an I-BCF subroutine for evaluating I-BCF processing rules in accordance with an embodiment.

FIG. 5 is a flowchart 440 that depicts an I-BCF subroutine for evaluating I-BCF rules I2, I5, and I6 in accordance with an embodiment. The processing steps of FIG. 5 generally correspond to step 440 depicted in FIG. 4.

The I-BCF subroutine is invoked (step 500), and an evaluation is made to determine if ANAT is included in the SDP (step 502). If ANAT is not included in the SDP, the IP type is selected to be the IP type of the peering network (step 504) according to I-BCF rules I2 and I6. An evaluation is then made to determine if there is an IP type mismatch (step 510).

Returning again to step 502, if ANAT is included in the SDP, an evaluation is made to determine if NAPT is needed if the address type is IPv4 (step 506). If NAPT is not needed, the IP type is selected to be the same as the peering network according to step 504. If it is determined that NAPT is needed, the IP type is selected to be the same as the first address type of the ANAT group (step 508). An evaluation is then made to determine if there is an IP type mismatch according to step 510. If there is no IP type mismatch, an evaluation may then be made to determine if there is an IPv4 address realm mismatch (step 512). If it is determined that there is no IPv4 address realm mismatch, the INVITE message may then be forwarded (step 518). If there is an IPv4 address realm mismatch identified at step 512, origination phase NAPT is invoked (step 514) according to rule G1, and the INVITE message is then forwarded according to step 518.

Returning again to step 510, if there is an IP address mismatch identified, origination phase ALG and NAPT-PT processing is invoked (step 516), and the INVITE message is forwarded according to step 518. The I-BCF subroutine cycle then ends according to step 520.

Figure 6:
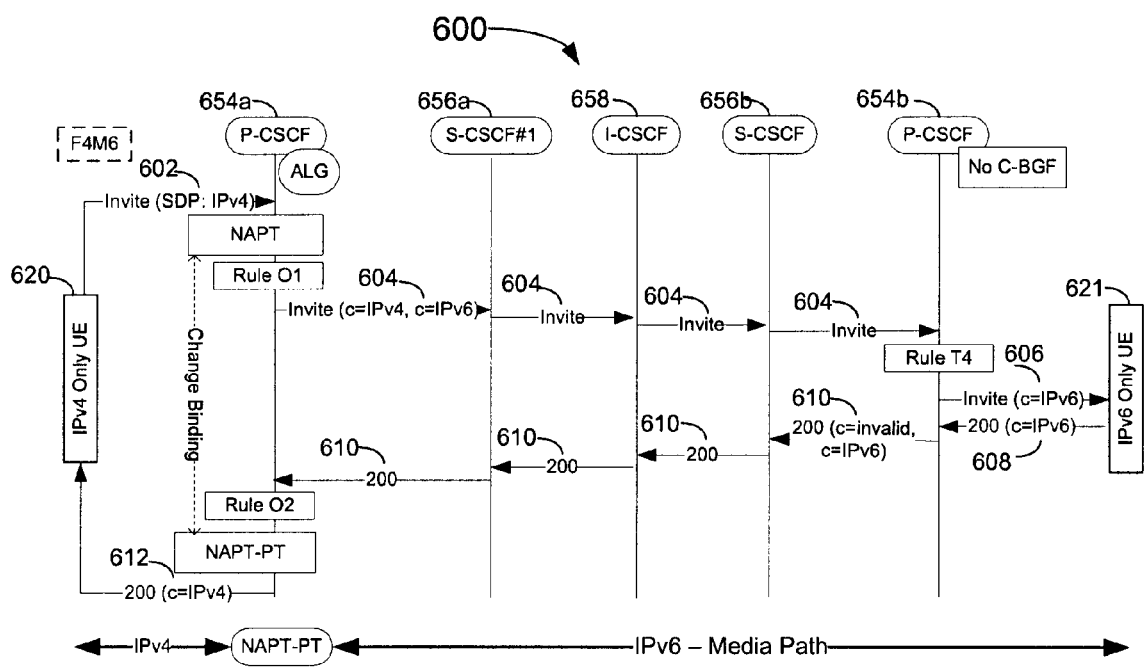
FIG. 6 is a diagrammatic representation of an exemplary signaling flow featuring IPv4 and IPv6 migration utilizing dual stack emulation implemented in accordance with an embodiment.

FIG. 6 is a diagrammatic representation of an exemplary signaling flow featuring IPv4 and IPv6 migration utilizing dual stack emulation implemented in accordance with an embodiment. In the present example, an originating UE 620 comprising an IPv4 only UE originates an INVITE to an IPv6 only UE 621. For illustrative purposes, assume UE 620 is in a Type A access network. In this case, the terminating P-CSCF does not have direct inference on any NAPT-PT devices.

The INVITE 602 issued on the originating side includes an IPv4 address in the SDP. On receipt of the INVITE 602 by P-CSCF 654a, NAPT is invoked according to Rule O1 and reformats the SDP to include an ANAT. The reformatted INVITE 604 including an IPv4 and IPv6 address in an ANAT group is then transmitted toward the destination UE 621 via S-CSCF 656a, I-CSCF 658, S-CSCF 656b, and is received by P-CSCF 654b on the termination side. In this instance, P-CSCF invokes processing according to rule T4 and thus removes the IPv4 address from the SDP of the INVITE such that the address type matches termination side UE 621. The INVITE including only an IPv6 address is then forwarded to the UE 611 which replies with a 200 response 608. The P-CSCF invalidates the IPv4 address and forwards the 200 response towards the originating UE 620. P-CSCF processing proceeds according to rule O2 and NAPT-PT processing is invoked. The 200 response 612 is then reformatted accordingly to include an IPv4 address, and the response is forwarded to the originating UE 620.

The flowcharts of FIGS. 2A-5 depict process serialization to facilitate an understanding of disclosed embodiments and are not necessarily indicative of serialization of the operations being performed. In various embodiments, the processing steps described in FIGS. 2A-5 may be performed in varying order, and one or more depicted steps may be performed in parallel with other steps. Additionally, execution of some processing steps of FIGS. 2A-5 may be excluded without departing from embodiments disclosed herein.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A method of session initiation in a network system having at least one border and including devices having a first address type and devices having a second address type, comprising:
   receiving a session invite request from a calling user equipment;
   determining at decision making point at the border of the network whether the session invite request includes both the first and second address types, wherein the first address type is based on one of an IPv4 or an IPv6 protocol, and the second address type is based on the other of the IPv4 or the IPv6 protocol; and
   emulating, by a call session control function invoked by the decision making point, a dual stack user equipment, when the session invite request inductee one of the first and the second address types, but not the other of the first and second address types:
   wherein, the invite request after said emulating includes a first address group of the first address type, the first address group including a calling user equipment address, and a second address group of the second address type, the second address group including a called user equipment address.

2. The method of claim 1, wherein the call session control function comprises a proxy-call session control function, and wherein the network system is adapted to perform network address port translation and network address port translation-protocol translation.

3. A method of session initiation in a network system having least one border, comprising:
   receiving, on a termination side equipment, a session invite message;
   determining at the border of the network whether the session invite request includes both the first and second address types, wherein the first type is based on one of an IPv4 or an IPv6 protocol, and the second address type is based on the other of the IPv4 or the IPv6 protocol; and
   performing on the termination side equipment network address port translation-protocol translation, by emulating dual stack user equipment, and including in the invite request a first address group of the first address type, the first address group including a calling user equipment address, and a second address group of the second address type, the second address group including a called user equipment address.

4. The method of claim 3, wherein the performing compromises invoking an Interconnection Border Control Function.

5. A method of session initiation in a network system having at least one border, comprising:
   receiving a session invite request including a first address types group and not including an alternative network address types group; and
   inserting at the border of the network, by an interconnection border control function emulating dual stack user equipment, in the invite request a calling user equipment address as a first address of an alternative network address types group and a called user equipment address as a second address of the alternative network address types group, wherein the first address types group is based on one of an IPv4 or an IPv6 protocol, and the alternative network address types group is based on the other of the IPv4 or the IPv6 protocol.

6. The method of claim 5, wherein a first alternative network address types group includes an address-type version indicated in a session description protocol message of the invite request.

7. A method of session initiation in a network having at least one border and adapted to perform network address port translation-protocol translation, comprising:
   determining at the border of the network whether a session invite request from a calling user equipment includes a first address types group of a first address type and does not include alternative network address types group, the first address types group including a calling user equipment address; and
   emulating, by a proxy-call session control function, a dual stack user equipment by including the calling user equipment address in a first alternative network address types group of a second address type in the session invite request and a called user equipment address in the first alternative network address type group, wherein the first address type is based on one of an IPv4 or an IPv6 protocol, and the second address type is based on the other of the IPv4 or the IPv6 protocol.

8. The method of claim 5, wherein an address type for a session between the calling user equipment is determined by a terminating proxy-call session control function in the event the invite request is transmitted to the called user equipment.

9. The method of claim 5, wherein an address type for a session between the calling user equipment and a called user equipment is determined by a media gateway controller function in the event the invite request is sent to a public switched telephone network prior to delivery to a called user equipment.

10. The method of claim 5, wherein an address type for a session between the calling user equipment and a called user equipment is determined by an interconnection border control function if the invite request is sent to a remote network prior to delivery to the called user equipment.

11. The method of claim 5, wherein the terminating equipment may link with a network address port translation protocol translation-compliant equipment if no network address port translation-protocol translation-compliant equipment is included in a media path between the calling user equipment and a called user equipment.

* * * * *